Mar. 6, 1923.　　　　　　　　　　　　　　　　　　1,447,759.
J. H. CHRISTENSEN.
SENSITIZED PHOTOGRAPHIC ELEMENT.
FILED OCT. 1, 1918.
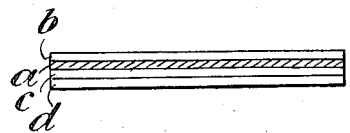
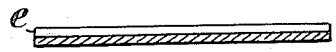

Patented Mar. 6, 1923.

1,447,759

UNITED STATES PATENT OFFICE.

JENS HERMAN CHRISTENSEN, OF SOLLEROD, DENMARK.

SENSITIZED PHOTOGRAPHIC ELEMENT.

Application filed October 1, 1918. Serial No. 256,446.

*To all whom it may concern:*

Be it known that I, JENS HERMAN CHRISTENSEN, a subject of the King of Denmark, residing at Sollerod, Holte, Denmark, have invented new and useful Improvements in Sensitized Photographic Element (for which I have filed an application in Denmark Sept. 27, 1917, Sub No. 1735/17); and I do hereby declare the following to be a full, clear, and exact description of the same.

The invention aims at producing a photographic material which is transparent and can be made highly sensitive. This is attained by augmenting the quantity of gelatine by an exceedingly high degree and using less than the quantity of silver bromide in an ordinary silver bromide plate.

In the accompanying drawing, Fig. 1 is a section of a film with a plurality of coatings therein, arranged in accordance with my invention, and Fig. 2 is a section of a film to be used with a film illustrated in Fig. 1 when three color photography is to be practiced.

As an experiment in a laboratory the following method may for instance be used: A plate 9 by 12 cm. coated with gelatino silver bromide emulsion is placed in water so that the gelatine is soaked, whereafter the emulsion is scraped off and melted in a water-bath. To this small quantity of emulsion is added 40 cc. 6% solution of gelatine at for instance 40–50° C., and all of it is well mixed by shaking. By thin coating 20–30 plates 9 by 12 cm. can now be produced with the emulsion from this one plate, which plates have retained the sensitiveness while they are perfectly transparent even if several of such plates are superposed.

When such a plate is illuminated in a camera a negative which is exceedingly thin and perfectly unfit for ordinary copying is obtained after development and fixing; but from such a negative an efficient printing negative can be produced. For instance these negatives can be intensified by known methods thereby obtaining greater opacity; but the best result by far is obtained by transforming the silver into a colouring matter absorbing compound and subsequently soaking the plate in a solution of an appropriate dyeing substance. Such dye absorbing substances are silver iodide, silver sulphocyanide and colorless cuprous salts. If instead of the silver the unreduced silver bromide be transformed into a dye absorbing substance a positive will result instead of a negative.

An intensely coloured picture is thus obtained which in ordinary manner can be used for copying or which may form one of the part pictures in three colour photography. The said photographic films being transparent more of such films may be superposed during the photographing and in this way all of the part negatives can be illuminated contemporarily without perceptible loss of sharpness.

In the production of two colour pictures according to this method the two differently sensitized photographic films may be arranged one on each side of the same film.

In the production of three colour pictures one single film may be arranged on celluloid, glass or the like and used in connection with the above named double-film.

In Fig. 1 a thin celluloid film $a$ acts as a support and is covered on one side with a blue sensitive film $b$ of the transparent kind referred to. Upon the other side of the film support is a film $c$ with a yellow filter dye, and also a green sensitive film $d$ of the above named transparent kind.

This element which contains two sensitive films is intended for use in connection with another element, Fig. 2, covered with a red sensitive film $e$ for producing a three color photograph. The two elements are attached to each other and illuminated at the same time. If wanted a red thin light filter is placed between the green sensitive and the red sensitive films during the exposure.

Between and in front of the various films suitable screens may be arranged if necessary.

Having thus fully described my invention, I claim as new and desire to secure by Letters Patent in U. S. A.

1. The sensitized photographic element consisting of a support covered with a silver halogenide gelatin film of ordinarily used sensitiveness in which the silver halogenide is found in so small a quantity in relation to the quantity of gelatin that the photographic film is transparent and allows the light to pass through the same practically without any spreading.

2. A sensitized photographic element comprising a transparent carrier coated with a plurality of silver halogenide gelatine films of ordinarily used sensitiveness, in which the silver halogenide is found in so small a quantity in relation to the quantity of gelatine that the photographic films are transparent and allow the light to pass through the same practically without spreading.

In testimony whereof I have affixed my signature in presence of two witnesses.

JENS HERMAN CHRISTENSEN.

Witnesses:
   CECIL V. SCHOU,
   VIGGO BLOM.